(12) United States Patent  (10) Patent No.: US 8,655,186 B2
Mahlab et al.                (45) Date of Patent:     Feb. 18, 2014

(54) TECHNIQUE FOR SELECTIVELY CHANGING DISPERSION IN OPTICAL COMMUNICATION CHANNELS

(75) Inventors: Uri Mahlab, Or Yehuda (IL); Avi Levy, Ramat-Gan (IL)

(73) Assignee: ECI Telecom Ltd., Petach Tikva (IL)

( * ) Notice: Subject to any disclaimer, the term of this patent is extended or adjusted under 35 U.S.C. 154(b) by 358 days.

(21) Appl. No.: 13/121,271

(22) PCT Filed: Sep. 15, 2009

(86) PCT No.: PCT/IL2009/000898
§ 371 (c)(1),
(2), (4) Date: Mar. 28, 2011

(87) PCT Pub. No.: WO2010/035254
PCT Pub. Date: Apr. 1, 2010

(65) Prior Publication Data
US 2011/0176805 A1     Jul. 21, 2011

(30) Foreign Application Priority Data

Sep. 28, 2008 (IL) .......................................... 194411

(51) Int. Cl.
*H04B 10/00*    (2013.01)
*H04B 10/04*    (2011.01)
(52) U.S. Cl.
USPC .............................. 398/159; 398/29; 398/147

(58) Field of Classification Search
USPC ..................... 398/29, 147, 148, 149, 150, 159
See application file for complete search history.

(56) References Cited

U.S. PATENT DOCUMENTS

| 2002/0196490 A1* | 12/2002 | Smith ........................... 359/118 |
| 2003/0133641 A1* | 7/2003 | Yoo ................................. 385/14 |
| 2004/0161241 A1* | 8/2004 | Tomofuji et al. ............. 398/147 |
| 2004/0208619 A1 | 10/2004 | Li et al. |
| 2005/0008287 A1 | 1/2005 | Wilson |
| 2005/0191018 A1 | 9/2005 | Fuke et al. |
| 2007/0014515 A1* | 1/2007 | Sugawara et al. ............... 385/27 |
| 2008/0056726 A1 | 3/2008 | Sugiya et al. |

* cited by examiner

*Primary Examiner* — Daniel Dobson
(74) *Attorney, Agent, or Firm* — Browdy and Neimark, PLLC (57) ABSTRACT

A reconfigurable wavelength selective dispersion compensation device RWSDCD for selective compensation of dispersion in optical channels having different wavelengths. The RWSDCD comprises a controllable wavelength selective unit WSU having a plurality of local, wavelength related input/output (I/O) ports. The RWDSD also comprises a dispersion compensation cascade comprising at least one chain of successively connected dispersion compensation units DCUs, wherein one or more of the DCUs in the chain are respectively connectable to one or more of the local I/O ports. The RWSDCD outputs one or more of the incoming optical channels upon selectively compensating chromatic dispersion in them, by controllably passing these channels via one or more DCUs of the dispersion compensation cascade.

12 Claims, 4 Drawing Sheets

TECHNIQUE FOR SELECTIVELY CHANGING DISPERSION IN OPTICAL COMMUNICATION CHANNELS

FIELD OF THE INVENTION

The present invention relates to equipment for selectively changing/adjusting chromatic dispersion in different optical channels carrying information in optical networks.

BACKGROUND OF THE INVENTION

US2005008287A describes a modular dispersion compensator to compensate for dispersion of a WDM optical signal. The method begins by directing a WDM optical signal having a prescribed bandwidth to a first dispersion compensating element and substantially compensating, with the first dispersion compensating element, each wavelength in the WDM optical signal for dispersion at a prescribed wavelength within a first sub-band of the prescribed bandwidth. The method continues by directing to a second dispersion compensating element wavelengths received from the first dispersion compensating element outside the first sub-band and substantially compensating, with the second dispersion compensating element, each wavelength received from the first dispersion compensating element for dispersion at a prescribed wavelength within a second sub-band of the prescribed bandwidth. The wavelengths received from the second dispersion compensating element are combined within the second sub-band of the prescribed bandwidth with the wavelengths received from the first dispersion compensating element within the first sub-band.

US2004208619A discloses a Re-Configurable Dispersion Compensation Module (RDCM). The RDCM combines existing optical switch technology with existing fixed DCM technology and advantageously also with existing TDCM (Tunable Dispersion Compensation Module) technology into a programmable smart optical component. Advantageously Micro-Electrical Mechanical Switch (MEMS) optical switch technology may be used. The alternate RDCM technology provides a controller, and a set of controllable switches to employ a set of DCMs and TDCMs for adjusting the dispersion compensation along an optical signal path. This alternate RDCM technology mitigates the problems of conventional TDCMs, while fitting most of the requirements for high speed systems, and being of a compact size.

OBJECT AND SUMMARY OF THE INVENTION

There is a long felt need in providing a unite device (node) for optical networks such as wave division multiplexing (WDM) ones, which would allow selectively adjusting chromatic dispersion in a plurality of communication optical channels entering the node, would not require an individual tunable dispersion compensation module per each optical channel and would, be controllable to ensure maximally possible quality of transmission using internal facilities of the device.

None of the prior art devices proposes a simple economic structure utilizing simple principles of monitoring to achieve the above object.

The Inventors hereby propose a reconfigurable wavelength selective dispersion compensation device RWSDCD (for example, to be installed at a network node of an optical network) for selective compensation of dispersion in optical channels having respective different wavelengths, the RWSDCD having an input line for inputting incoming optical channels, and an output line for outputting outgoing optical channels, the RWSDCD comprising:

a controllable wavelength selective unit WSU (such as a Wavelength Selective Switch WSS, a Wavelength Selective Router WSR) having a plurality of local, wavelength related input/output (I/O) ports; the WSU being adapted to controllably configure assignment of selectively specified sets of the incoming optical channels to selectively specified local I/O ports of said plurality, in a way that any number of said incoming optical channels may at a time utilize any of said local I/O ports;

a dispersion compensation cascade comprising at least one chain of successively connected dispersion compensation units DCUs, wherein one or more of the DCUs in the chain are respectively connectable to one or more of said local I/O ports;

the arrangement of the RWSDCD being such that the output line outputs from the RWSDCD said outgoing optical channels comprising one or more of said incoming optical channels upon selectively compensating chromatic dispersion in them by controllably passing said one or more of the incoming optical channels via one or more DCUs of said dispersion compensation cascade.

In other words, the RWSDCD device is controllable so that any specific incoming optical channel having a specific wavelength can be selectively outputted from/inputted to the WSU via any specific local I/O port, and thereby said specific optical channel can be connected to the DC cascade at a selected junction of the chain (i.e., at a selected DCU) corresponding to the selected specific local I/O port, thus ensuring the predetermined degree of dispersion compensation for the optical channel having the specific wavelength.

In a preferred practical embodiment, said at least one chain of the cascaded comprises a first DCU and a last DCU each having at least two connections, and comprising at least one intermediate DCU having at least three connections;

and wherein said at least one chain is interconnected with said WSU in such a manner that said at least one intermediate DCU, via two of its at least three connections, is respectively connected with a preceding DCU in the chain and with a next DCU in the chain, and via a third of its at least three connections is connected to one of the local I/O ports of the WSU.

The DCU may comprise, for example, a Dispersion Compensation Fiber (DCF) or a Dispersion Compensation Module (DCM) based on the Bragg grating technology, on the holographic technology, etc. Preferably, not only the intermediate DCUs, but all DCUs in the chain are provided with at least three connections; however, the first and the last one in the chain (edge DCUs) may have at least two connections each, or may just utilize at least two connections of the at least three possible.

Connections of DCUs in the chain, as well as connections to the RWSDCD local I/O ports, the input line and the output line can be implemented by using industrially manufactured optical couplers. Preferably, 2×1 and 2×2 optical couplers can be used. When associated with a DCU module, the 2×1 coupler forms a three-connection DCU (junction) in the chain. The 2×2 coupler will respectively form with a DCU a four-connection DCU in the chain.

Some specific embodiments will be disclosed below and then illustrated with the aid of the drawings and explained in the detailed description.

In a first embodiment (schematically shown in FIG. 2), the controllable WSU is a controllable Wavelength Selective Switch (WSS), wherein:

said input line of the RWSDCD is a common input port of the WSS, for inputting said incoming optical channels into the WSS;

said output line of the RWSDCD is an optical fiber for combined outputting from the RWSDCD said outgoing optical channels comprising a first and a second groups of the incoming optical channels, wherein the first group has passed through the WSS without dispersion compensation while the second group has passed through the WSS and the dispersion compensation cascade;

the wavelength associated local I/O ports of the WSS are wavelength related local output ports; said at least three connections at an intermediate DCU comprise two input connections and one output connection (in practice, these "at least three connections" can be implemented as the three connections of the optical 2×1 coupler associated with the DCU);

at least one input connection of a first DCU in the chain is respectively connected to at least one of said local I/O output ports of the WSS, while the output connection of the first DCU is connected to one input connection of a next DCU in the chain;

one input connection of any intermediate DCU in the chain is connected to the output connection of a preceding DCU in the chain, and another input connection of said intermediate DCU is connected to one of said local I/O output ports of the WSS, while the output connection of said intermediate DCU is connected to one input connection of a next DCU in the chain;

one input connection of a last DCU in the chain is connected to the output of a preceding DCU in the chain, another input connection of said last DCU is connected to one of the local I/O output ports of the WSS, while the output of said last DCU is connected to an output common port of the WSS thus forming the output line of the RWSDCD. (The last mentioned connection is preferably implemented via an additional optical coupler and optionally, via an additional DCF/DCM switched in the output line).

In a second, modified embodiment of the RWSDCD (schematically shown in FIG. 3), the controllable WSU is also a controllable Wavelength Selective Switch, but said input line of the RWSDCD is merged with one connection of the first DCU in said dispersion compensation cascade, for inputting said incoming optical channels into the CDR;

said output line of the RWSDCD is a common output port of the WSS for outputting from the RWSDCD said outgoing optical channels comprising the incoming optical channels which have passed through the dispersion compensation cascade and the WSS;

the wavelength associated local I/O ports of the WSS are wavelength related local input ports; the three connections at an intermediate DCU comprise two output connections and one input connection (as above, these three connections are preferably associated with three connections of the optical 2×1 coupler connected with the DCU);

the first DCU in the chain has one input connection merged with the input line, and two output connections wherein one of them is connected to one of said local I/O input ports of the WSS, while the other output connection of the first DCU is connected to an input connection of a next DCU in the chain;

one input connection of any intermediate DCU in the chain is connected to the output connection of a preceding DCU in the chain, one output connection of said intermediate DCU is connected to one of said local I/O input ports of the WSS, while the other output connection of said intermediate DCU is connected to an input connection of a next DCU in the chain;

the last DCU in the chain has one input connection and one output connection, the input connection of the last DCU is connected to the output of a preceding DCU in the chain, while the output connection of said last DCU is connected to one of the local input ports of the WSS.

It should be appreciated that the first and the second embodiment described above can be combined into a third, hybrid embodiment (examples of such are in FIGS. 4A, 4B) so that some of the local I/O ports of the WSS are input ports and some of them are output ports; correspondingly, the arrangement of, the dispersion compensation cascade can be changed so as, for example, to comprise a first and a second chains of DCUs, wherein DCUs of the first chain receive sets of optical channels from the WSS, while DCUs of the second chain send other sets of optical channels to the WSS. Also, the arrangement of the input line and the output line in the third hybrid embodiment may be changed. In the preferred example (which is more suitable for bidirectional transmission, than other embodiments), the input line and the output line are both respectively merged with the common input port and the common output port of the WSS (like in FIG. 4B), and the two DCM chains are connected to the I/O ports of the WSS. The DCMs in the chains are preferably associated with optical couplers 2×2; however, optical couplers 2×1 can also be used.

Still a further modification may comprise an input line as in the first embodiment and an additional input line as in the second embodiment.

The WSU of the RWSDCD (actually, the Wavelength Selective Switch WSS) can be built on the basis of a reconfigurable add-drop multiplexer ROADM or on the basis of an WOXC (Wavelength selective Optical Cross-Connect) being an alternative of ROADM.

It is most preferable, that the above-mentioned third (hybrid) arrangements be designed with the WSU implemented on the basis of a reconfigurable add-drop multiplexer ROADM, for systematic inputting the added optical channels to the ROADM and for systematic outputting from the ROADM the optical channels to be dropped.

In one example, the WSU (WSS) can be a reconfigurable add-drop multiplexer ROADM, wherein the input line of the RWSDCD is a common input port of the ROADM, the output line of the RWSDCD is a through line of the ROADM, and the local I/O ports of the WSS are add/drop ports of the ROADM. In this case, the output connection of the last DCU in the dispersion compensation cascade can be connected to the through line of the ROADM via an add port of the ROADM (for example, as in FIG. 4A).

It should be noted then, that the RWSDCD comprising the ROADM WSS may handle additional incoming optical channels actually constituting added optical channels. The output line may also comprise additional outgoing channels being produced from those added to the ROADM WSS; the added optical channels may be selectively passed via the first cascade of dispersion compensation. Of course, some of the incoming optical channels may be dropped from the ROADM WSS, and before being dropped, the optical channels to be dropped may undergo selective dispersion compensation by passing one or another portion of the second cascade of DCUs. The most preferred implementation of such a hybrid embodiment would comprise 2×2 couplers/splitters associated with DCUs forming the chains of the DCU cascade (for example, as in FIG. 4B).

Figure 5:
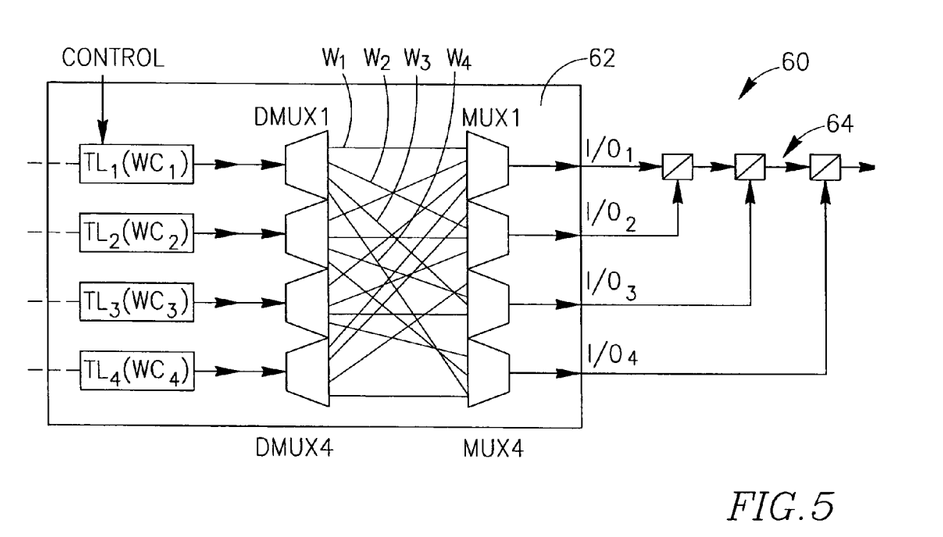
FIG. 5 shows yet a further—fourth—embodiment of the invention based on a Wavelength Router WR as a Wavelength Selective Unit.

Yet another, alternative embodiment of the RWSDCD (one example is shown in FIG. 5) can be based on utilizing a Wavelength Router WR as said WSU (the WR is also known as a Waveband Cross Connect WXC). The WR is controllable by controlling the wavelengths of the incoming optical channels by tunable lasers of their corresponding optical transmitters. In that embodiment, the input line of the RWSDCD is formed by the incoming optical channels, having tunable wavelengths and being entered in parallel into the WR. Each optical channel at the ingress is demultiplexed and, depending on its current wavelength, occurs at a local multiplexer of one or another output ports the wavelength router being local I/O ports of the WSU. The DCU cascade is connected to the output ports of the WR (which, in this embodiment, constitute local I/O ports of the WSU); the desired association/relation between the incoming optical channels and the local output ports of the WR is established by controlling the tunable laser transmitters of the incoming optical channels. A more detailed disclosure of the alternative (fourth) embodiment of the RWSDCD will be presented as the description proceeds.

Actually, the invention provides a new implementation of a wavelength selective switch WSS, based on the wavelength router WR, as described above—with or without the dispersion compensation cascade.

Figure 7:
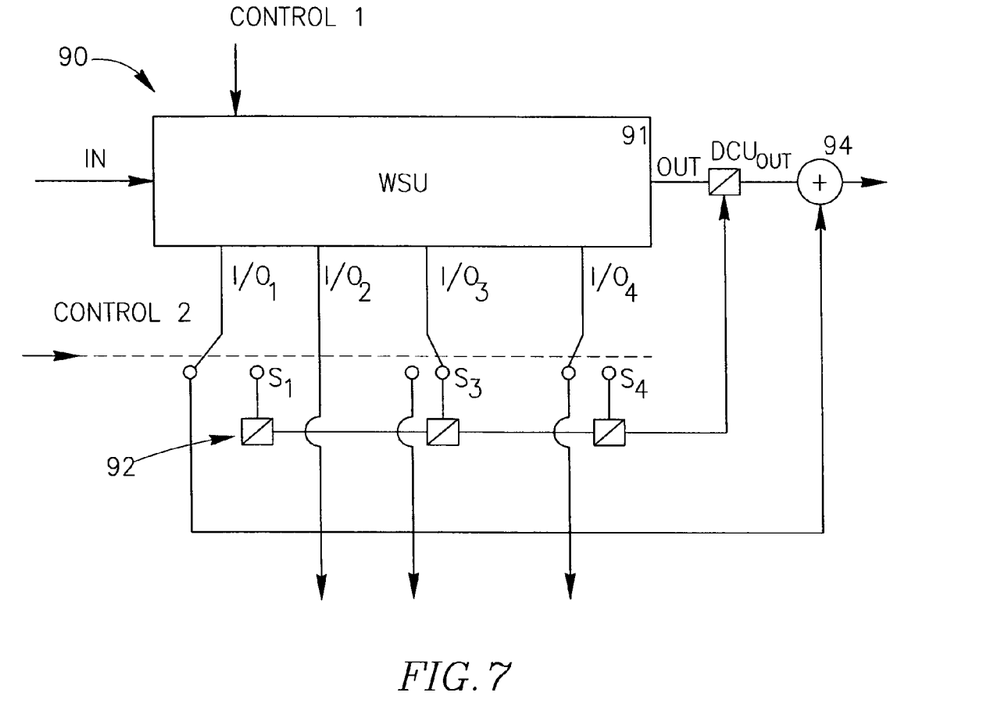
FIG. 7 illustrates an example of an optional preferred arrangement for connecting the dispersion compensating cascade to the wavelength selecting unit in the RWSDCD.

The RWSDCD device can preferably be provided with an additional degree of control: it may comprise one or more controllable switches respectively inserted between one or more of the local I/O ports and one or more of said DCUs in at least one chain of the cascade; each of said switches, when in its closed position, connecting a specific local I/O port to a specific DCU, while when in its open position—disconnecting said specific local I/O port from said specific DCU (see one example in FIG. 7).

Generally, the proposed controllable and reconfigurable device (RWSDCD) is controllable either by an operator, or by a control entity, for example by a local control unit or/and by a Network Management System.

Preferably, the control entity should be informed about levels of chromatic dispersion and/or other associated transmission parameters in various optical channels being handled by the proposed RWSDCD, and that information can be supplied to the control entity by one or more monitoring means. The monitoring means may, for example, measure chromatic dispersion in optical communication channels. For example, it can be performed by utilizing a device for measurement of chromatic dispersion (for example, based on the U.S. Pat. No. 7,064,814 BB of the Assignee).

Alternatively, the monitoring means may monitor a transmission parameter BER (bit error rate) which, in practice, reflects the level of chromatic dispersion in an optical channel. It is assumed that the outgoing optical channels respectively carry digital optical signals. (It should be kept in mind that chromatic dispersion causes the blurring of pulses in a digital optical signal transmitted via an optical communication fiber, and therefore inevitably increases the number of mistakes at the receiving end.)

For example, the proposed controlled reconfigurable device RWSDCD may comprise a control unit interconnected with a monitoring unit for continuously or periodically monitoring Bit Error Rate (BER) at least at some of said outgoing optical channels and informing the control unit about results of the monitoring.

For example, the monitoring unit may comprise a demultiplexer connected to the output line and a number of individual BER monitors (BER measuring units), respectively connected to the demultiplexed individual optical channels.

According to another example, the monitoring unit may comprise a controlled tunable filter which, from time to time or periodically, selectively picks a specific outgoing optical channel and connects it either to a dispersion measurement unit or to a BER monitor (BER measurement unit).

Preferably, the monitoring unit controllably monitors (continuously, periodically, from time to time) all said outgoing optical channels.

Based on the monitoring results—for example, BER measurements performed by the BER monitor for a particular optical channel show that the BER parameter of transmission is low/has deteriorated in comparison with a pre-determined reference value stored in the control device—the control device may change the local I/O port of the WSU. This will change the junction at which the particular optical channel is connected to the DCU chain and cause adjustment of the dispersion compensation introduced in that particular optical channel, thereby improving the BER of said particular channel. In practice, such an operation may require a number of iterations.

According to another embodiment, the monitoring unit may monitor spare outgoing optical channels (those having wavelengths presently unused at that specific node of the network). Such spare optical channels are usually present in optical networks, so if they enter the RWSDCD via the input line, they will most probably be outputted via the output line. We suppose that such spare optical channels carry some idle digital traffic (at least for the BER monitoring purpose). Information about BER (or dispersion) in the spare optical channels can be stored in the control device. In case a particular one of the spare outgoing optical channels demonstrates a better BER than a specific one of the "basic" outgoing optical channels, the monitoring unit may cause switching the wavelength of an incoming optical channel corresponding to the specific "basic" outgoing optical channel to the wavelength of said particular spare optical channel.

It is assumed that, for making a decision to switch the wavelength, the detected deterioration of BER in the specific "basic" channel cannot be alleviated by changing the local I/O port at the WSU. So, we propose to try using more DCUs in the chain for an optical channel that has demonstrated a bad BER parameter and, if that operation does not improve the BER, we propose to try changing the wavelength of transmission. (That idea can be applied to any of the mentioned embodiments, not only to those associated with Wavelength Router).

For example, the wavelength switching operation can be initiated by the control unit (or a control entity such as NMS) upon receiving non-satisfactory monitoring results from the monitoring unit, upon which the control unit compares the monitoring results with predetermined parameters stored in its memory and issues a control/management request for wavelength switching in the network; the request then causes:
 a) tuning of a tunable laser of the specific incoming optical channel to switch it to a desired spare optical wavelength,
 b) tuning of the suitable optical receiver accordingly at the receiving end of the specific optical channel;
 c) using the monitoring unit to check whether the performed wavelength switching to the desired (new) wavelength has improved the BER parameter of said specific optical channel. The check is preferably performed at a pilot digital signal.
 d) optionally, further improving the BER parameter by adjusting the dispersion compensation cascade for said new wavelength;

e) if the check result is positive, launching the specific optical channel at the new wavelength i.e., transmitting a real digital signal via said specific optical channel. It goes without saying that the procedure should include a step of settling other possible discrepancies in the network—administrative and technical—which can be caused by the performed wavelength switching.

Alternatively, the control unit may perform control operations without monitoring the channels, just on the basis of a library of routes preliminarily stored in a memory of the control unit. For example, if the destination has changed in a specific optical channel, the control unit of the RWSDCD can be informed by NMS about the change of the route, say in terms of its new length; the control unit should be adapted to find in its internal library at least one of the following:
a) a new combination of DCUs in the cascade suitable for compensating dispersion on the new route;
b) a new wavelength to be used for the new route.

DETAILED DESCRIPTION OF THE PREFERRED EMBODIMENTS

Figure 1:
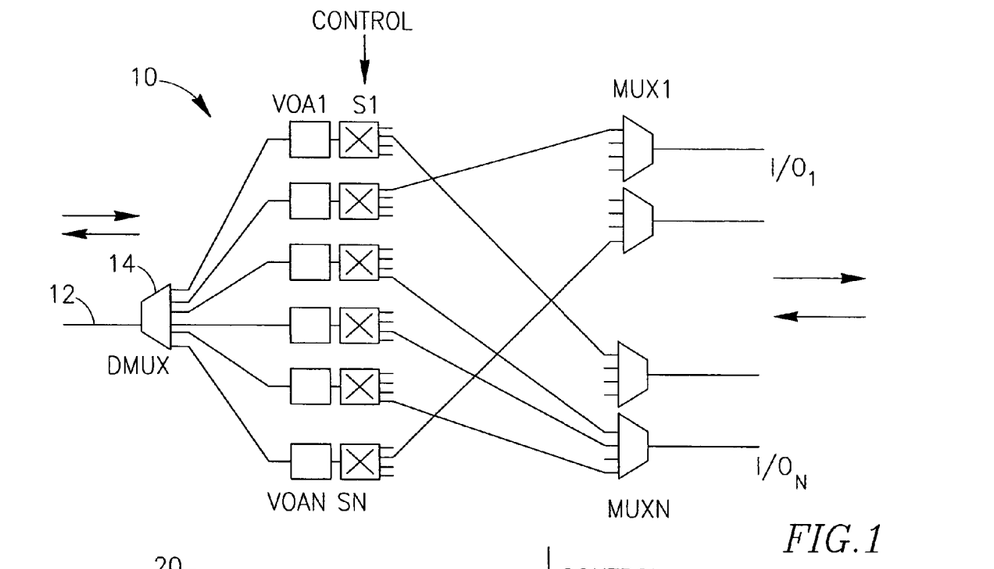
FIG. 1 (prior art) illustrates a basic structure of a controllable Wavelength Selective Switch (WSS).

FIG. 1 (prior art) schematically illustrates how a wavelength selective switch WSS is organized. The illustrated structure 10 is adapted to serve optical bidirectional transmission. From left to right, a number of multiplexed N optical channels arrive to a West common port 12 where the channels are demultiplexed by DMUX 14; each individual optical channel is fed to a variable optical attenuator out of $VOA_1$ to $VOA_N$ and then switched by a controllable optical 1×N switch (out of $S_1$ to $S_N$) to one or more outputs of that switch. N outputs of each specific switch are connected to N respective multiplexers $MUX_1$-$MUX_N$ so that, depending on the controlled position of each specific switch, each of the multiplexers forms at its output a required set of optical channels (each set may comprise from 0 to N different optical channels). These channels can be considered dropped channels, in the described direction of transmission from left to right. Outputs of the multiplexers can be considered local I/O ports ($I/O_1$-$I/O_N$) of the WSS, though one of the multiplexers (not indicated specifically in FIG. 1) may be arranged to form an I/O port being an East common port of the WSS carrying all N channels. In the opposite direction, any incoming set of optical channels can be controllably added to the structure 10 via the local I/O ports, while one of them (the mentioned East common port) can be used for inputting the multiplexed N optical channels in the direction from right to left.

In the drawing, controllability of the WSS is schematically shown as a vertical arrow pointing to the row of switches $S_1$ to $S_N$. By controlling the switches $S_1$ to $S_N$, one can select one or another of the I/O ports of the WSS for various sets of channels/wavelengths.

The illustrated principle of the WSS 10 is actually one principle of a reconfigurable OADM.

Figure 2:
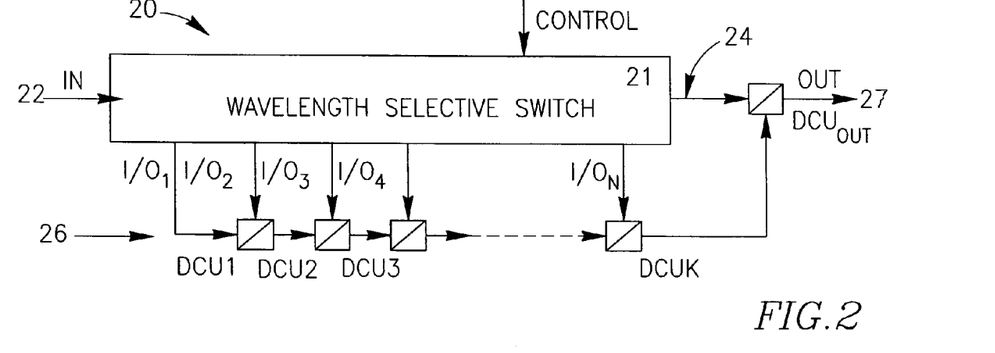
FIG. 2 illustrates a first embodiment of the basic structure of the controllable reconfigurable wavelength selective dispersion compensating device RWSDCD according to the invention, based on a WSS and a cascade of DCUs.

FIG. 2 illustrates one embodiment (20) of the proposed RWSDCD based on a controllable WSS marked 21. The west (input) common port is marked 22 and constitutes the input line of the RWSDCD, the east (output) common port is marked 24.

The RWSDCD is provided with a Dispersion Compensation Cascade 26 comprising a chain of K dispersion compensation units $DCU_1$, $DCU_2$, $DCU_3$ ... $DCU_K$, each coupled to one local I/O port of the WSS. In this embodiment, the local I/O ports are output ports. Each of the DCUs comprises a dispersion compensation module/fiber having a particular value of compensation, with a 2×1 optical coupler for connecting the module to the I/O port and to other DCUs in the chain. The output common port 24 is connected to the output line 27 via optional additional dispersion compensation $DCU_{OUT}$.

By controlling the WSS 21, any set of optical channels (out of those incoming via the common input line 21) can be formed at any of the output ports ($I/O_1$-$I/O_K$), and thus any of the optical channels can be routed through a selected succession of the DCUs, according to the specific need.

Figure 3:
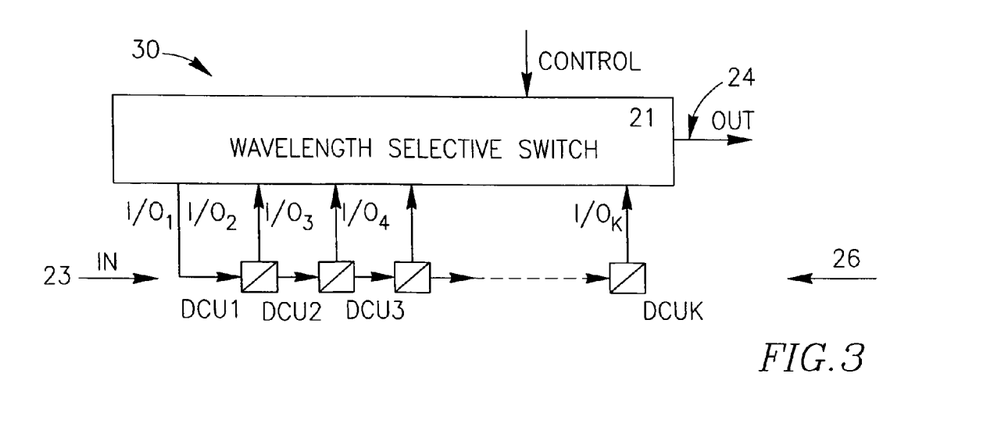
FIG. 3 illustrates a second basic embodiment of the invention based on the WSS implementation.

FIG. 3 shows another embodiment of the proposed RWSDCD 30. Elements similar to those in FIG. 2 are marked with similar numbers. In the device 30, local I/O ports of the WSS 21 are used as input ports. The input line of the device 30 is marked 23, it is merged with one input connection of the first DCU in the chain 26. The common output port 24 of the device 30 constitutes the common output line.

Figure 4A:
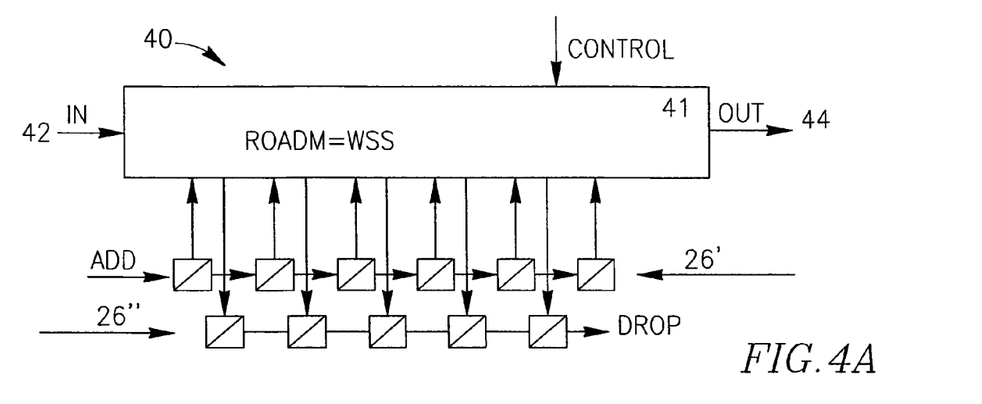
FIG. 4A illustrates one example of a hybrid (third) embodiment of the invention based on the ROADM implementation of the Wavelength Selective Unit WSU.

FIG. 4 A illustrates one hybrid embodiment 40 of the RWSDCD. The hybrid RWSDCD comprises a wavelength selecting unit (WSU) 41 being an ROADM based Wavelength Selective Switch WSS. The WSU 41 may, for example, comprise a matrix of two or more structures similar to the WSS 21, where at least one WSS utilizes its local I/O ports as input ports, and at least one—as output ports. Alternatively, the WSU 41 may be based on a Wavelength Optical Cross Connect WOXC.

The ROADM 41 has a common input line 42 and a common output ("through") line 44. The ROADM 41 is equipped with a dispersion compensating cascade comprising two DCU chains 26' and 26", one of the chains being connected to the input local ports an the other chain—to the output local ports.

The optical channels to be added to ROADM 41 can be inputted at the input ADD of the chain 26', any specific one of these channels may pass as many of the DCUs in the chain and enter the ROADM at the I/O (input) port assigned for that by the controllably arranged internal elements of the unit 41. Similarly, each of the optical channels to be dropped from the ROADM leaves it via a specific I/O (output) port specified for that channel so as to convey it through a required (for that channel) succession of the DCUs in the chain 26".

The embodiment of FIG. 4A is implemented using 2×1 optical couplers at the DCU junctions of the chains 26' and 26".

Figure 4B:
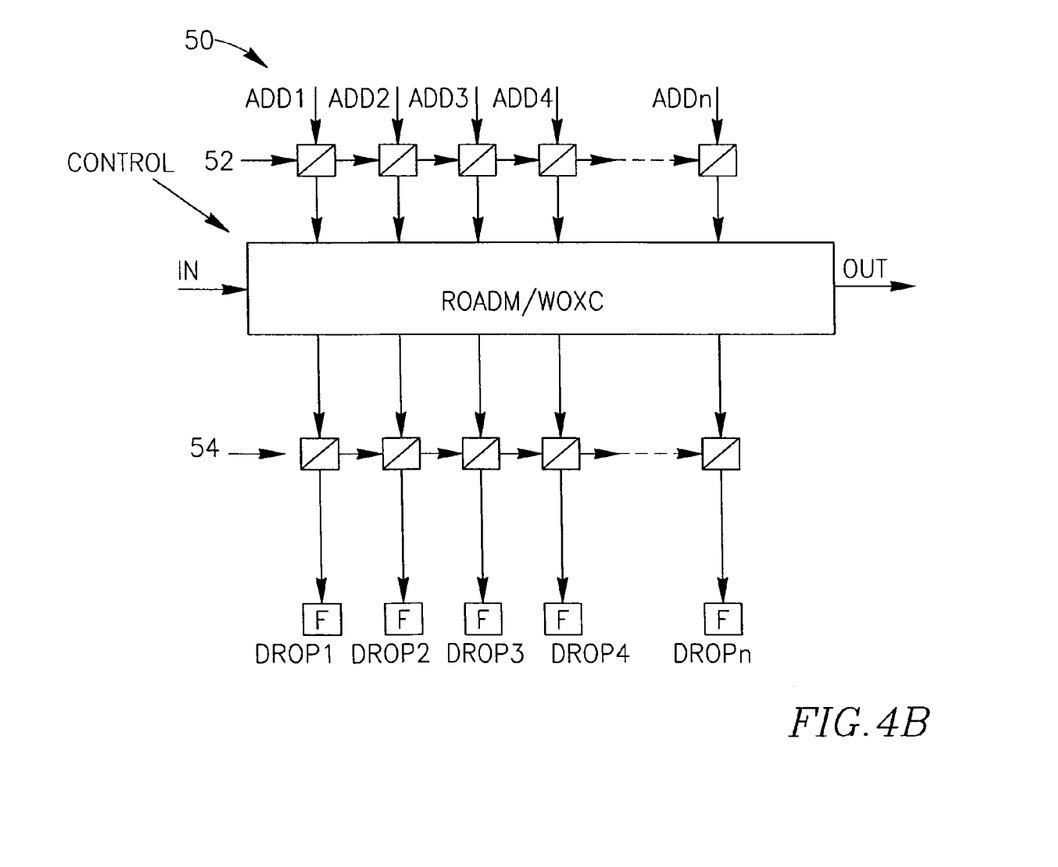
FIG. 4B illustrates another example of a hybrid embodiment of the invention based on the ROADM or WOXC implementation of the Wavelength Selective Unit WSU.

FIG. 4B shows another hybrid embodiment 50 differing from the hybrid embodiment 40 of FIG. 4A in that it allows adding and dropping individual optical channels (or specific sets of channels) and, for that purpose, utilizes industrially available 2×2 or 3×1 optical couplers for forming DCU blocks of chains 52 and 54. For dropping specific individual channels from the chain 54, the fourth connection of each specific DCU has to be additionally provided with a suitable optical filter F.

FIG. 5 illustrates a schematic embodiment 60 of the RWS-DCD, where the Wavelength Selecting unit is implemented as a Wavelength Router 62 controllable by tuning tunable lasers $TL_1$-$TL_N$ (or Wavelength Converting blocks $WC_1$-$WC_N$) of the incoming optical channels (in this example of the router, N=4). In case of the tunable lasers TL, the RWSDCD performs pre-compensation of dispersion in the optical channels, based on information concerning the remote west-side portion of the network (not shown), which can be obtained, say, from a Network Management System. In case of the wavelength convertors WC, the optical channels indicated by four dashed lines may arrive from an east-side portion of the network (possibly, upon "opening the combined channel by a demultiplexer), and the RWSDCD will perform compensation of the real accumulated dispersion per channel. It is understood that a hybrid embodiment is possible, when some channels are input via tunable lasers and some—via wavelength converters. The input line of the RWSDCD 60 is presented by the incoming optical channels applied to the RWS-DCD in parallel. Let us describe the operation of the WSDCD when the Wavelength Router 62 comprises a row of tunable lasers $TL_1$-$TL_N$. Suppose that $TL_1$ is adapted to be tuned to one of four optical wavelengths: w1, w2, w3 or w4. The $DMUX_1$ out of the row of $DMUX_1$-$DMUX_N$ is adapted to demultiplex the received optical signal so that the wavelength to which the $TL_1$ is currently tuned appears at a particular output port of the $DMUX_1$, which is connected to a specific multiplexer MUX out of the row $MUX_1$-$MUX_N$. Outputs of the multiplexers form local I/O ports of the device: $I/O_1$-$I/O_N$, which are connected to a Dispersion Compensation Cascade 64 comprising a chain of DCU units. Since each TL is adapted to be tuned to one of the same four optical wavelengths and since the tunable lasers $TL_1$-$TL_N$ can be tuned so as to change assignments of the wavelengths to the lasers, any of the optical channels/wavelengths may selectively appear at any of the I/O ports $I/O_1$-$I/O_N$ of the RWSDCD. A set of optical channels (0-N) that appear at a particular I/O port (local output port) is further fed to a corresponding DCU in the chain 64 and is successively handled by one or more DCUs of the chain.

Concerning all of the above-described examples, it should be kept in mind that a matrix of basic structures can be built to implement the proposed RWSDCD for real optical communication lines typically carrying multiple DWDM optical channels.

The above-described embodiment, taken with or without the DCM cascade, actually forms a WR-based implementation of a WSS.

Indeed, a wavelength selective switch WSS can be implemented based on a wavelength router WR that handles a set of N incoming optical channels having changeable incoming wavelengths, wherein each of the incoming wavelengths is selected out of a set of N incoming wavelengths (w1, ... wN), the WR comprising: a set of N demultiplexers, each having N outputs and adapted to demultiplex a specific one of the N incoming optical channels and to issue at one of its N outputs the incoming wavelength selected at the specific optical channel incoming said demultiplexer;

a set of N multiplexers, each having N inputs;

said N demultiplexers are interconnected with said N Multiplexers so that N outputs of each demultiplexer are respectively connected to N multiplexers via respective inputs;

the arrangement being such that outputs of said N multiplexers form N local I/O ports of a Wavelength Selective Switch, wherein any of the N possible incoming wavelengths may controllably be output via any of the local I/O ports, wherein the control being provided by selecting wavelengths of the N incoming optical channels among said N incoming wavelengths (w1 ... wN).

Figure 6:
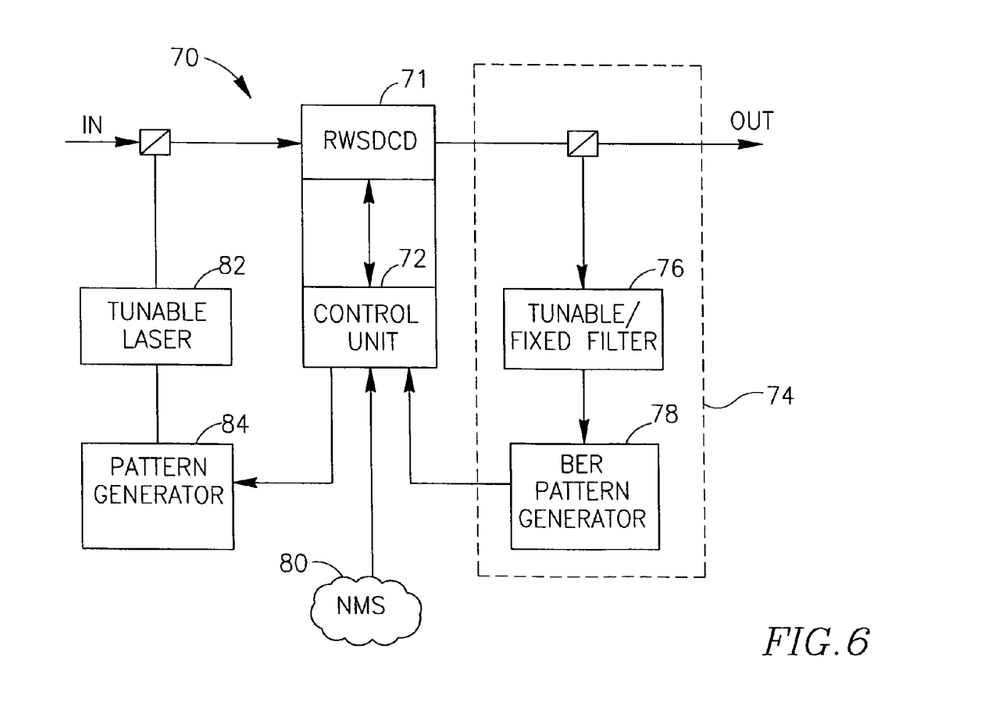
FIG. 6 shows a schematic block diagram illustrating an example of how the proposed RWSDCD can be controlled, by utilizing a control unit and a monitoring block.

FIG. 6 illustrates a schematic block diagram of yet another embodiment 70 of the proposed RWSDCD, with a control unit 72 embedded in the basic RWDCD structure 71 and a monitoring unit 74 interconnected with the control unit 72. The basic RWDCD structure 71 can be built, say, according to embodiment 50 (though other embodiments can also be used). It should be kept in mind that FIG. 6 illustrates blocks serving only one direction of transmission via the RWSDCD, and that additional, symmetric blocks would be necessary to illustrate in order to explain how optical channels are handled in the opposite direction of transmission.

The monitoring unit 60 comprises a controlled tunable filter 66 which, from time to time or periodically, selectively picks a specific outgoing optical channel from the output line (OUT) and connects it a BER detector 68. The detector informs the control unit 62 about results of the monitoring of that specific channel. The monitoring unit 74 thereby controllably monitors (continuously, periodically, from time to time) all the outgoing optical channels. For example, BER measurements performed by the BER detector for a particular optical channel show that the BER parameter of transmission is low or has deteriorated in comparison with a pre-determined reference value stored in the control unit 72. Based on the monitoring results, the control unit 72 is adapted to change the local I/O port of the RWSDCD 71, thus changing the dispersion compensation introduced in that particular optical channel and, possibly, improving the BER measurement of the particular channel. In practice, such an operation may require a number of iterations.

If the detected BER parameter in the particular optical channel cannot be improved by utilizing more DCUs in the chain, the control unit 72 and/or a Network Management System 80 should be capable to make a decision to change the wavelength of transmission in that channel. For example, a spare optical wavelength can be chosen, which has been monitored and has demonstrated a satisfying BER parameter. The decision to change the wavelength will initiate the following list of actions:

a) tuning of a tunable laser 82 (or a wavelength converter) of the specific incoming optical channel to switch it to a desired (preferably, spare) optical wavelength, b) accordingly, tuning of a suitable optical receiver at the receiving end of the specific optical channel;

c) using the monitoring unit 74 to check whether the performed wavelength switching to the desired wavelength has improved the BER parameter of the specific optical channel. The check is performed at a pilot digital signal generated by a pattern generator 84.

d) optionally, further improving the BER parameter by adjusting the dispersion compensation cascade of the RWSDCD 71 for the new wavelength;

e) if the check result is positive, transmitting the necessary real digital signal via the specific optical channel at the new wavelength.

It goes without saying that the procedure should include a step of settling other possible discrepancies in the network—administrative and technical—which can be caused by the performed wavelength switching.

Alternatively or in addition, the control unit 72 can be adapted to perform some control operations without monitoring the optical channels by block 74, just on the basis of a library of routes preliminarily stored in a memory of the control unit 72. For example, if the destination has changed for a specific optical channel, the control unit 72 can be informed by NMS 80 about the change of the route (say, in terms of its new length). Based on that, the control unit 72 will determine either a new combination of DCUs in the DCU cascade for compensating the changed dispersion on the new route, or a new wavelength to be used for the new route, or both.

The control unit 72 preferably stores a library (a data base) of possible routes in the network for various optical channels. In case it is informed by NMS about changing the route for any channel, the control unit will inform the RWSDCD block 71 about adjusting chromatic dispersion for the new route, by one or both of the discussed ways (selecting the appropriate DCU combination in the cascade and selecting a new wavelength for the channel).

FIG. 7 illustrates an optional solution 90 for interconnecting the WSU and the DC cascade in the RWSDCD. The solution shown in FIG. 7 can be applied, with slight variations, to any of the RWSDCD embodiments schematically illustrated in FIGS. 2-5. In FIG. 7, the WSU 91 is controlled (the arrow CONTROL 1) so as to form at each of its local I/O ports selectable sets of optical channels. Four exemplary output ports $I/O_1$-$I/O_4$ are shown in more details. One of them ($I/O_2$) is not connected to the cascade 92 and may, for example, be used as a simple drop port. Three remaining ports $I/O_1$, $I/O_3$, $I/O_4$ are selectively connectable to the dispersion compensation cascade 92 via respective controlled switches S1, S3 and S4 (the dashed arrow CONTROL 2). By means of the controlled switches, each of these ports can be:

connected to the cascade 92 (like it is shown for port $I/O_3$ by switch S3) for compensating dispersion in optical channels assigned to $I/O_3$, or left without compensating dispersion in its "assigned" channels, and be further used either as a drop port (as shown for $I/O_4$ by switch S4), or as a "though" port (as shown for $I/O_1$ by switch S1 and then by coupler 94).

The arrangement allows utilizing the local I/O ports of the RWSDCD more economically if all local I/O ports are equipped with controlled switches like S1-S4.

It should be appreciated that various modifications of the proposed embodiments of the controlled RWSDCD can be proposed, which should be considered part of the invention as far being generally defined by the following claims.

The invention claimed is:

1. A reconfigurable wavelength selective dispersion compensation device RWSDCD for selective compensation of dispersion in optical channels having respective different wavelengths, the RWSDCD having an input line for inputting incoming optical channels, and an output line for outputting outgoing optical channels, the RWSDCD comprising:

a controllable wavelength selective unit WSU having a plurality of local, wavelength related input/output (I/O) ports; the WSU being adapted to controllably configure assignment of the incoming optical channels to the local I/O ports of said plurality in a way that any number of said incoming optical channels may at a time utilize any of said local I/O ports;

a dispersion compensation cascade comprising at least one chain of successively connected dispersion compensation units DCUs, wherein one or more of the DCUs in the chain are respectively connectable to one or more of said local I/O ports;

the arrangement of the RWSDCD being such that the output line outputs from the RWSDCD said outgoing optical channels comprising one or more of said incoming optical channels upon selectively compensating chromatic dispersion in them by controllably passing said one or more of the incoming optical channels via one or more DCUs of said dispersion compensation cascade, wherein said at least one chain comprises a first DCU and a last DCU each having at least two connections, and comprising at least one intermediate DCU having at least three connections; and wherein said at least one chain is interconnected with said WSU in such a manner that said at least one intermediate DCU, via two of said at least three connections, is respectively connected with a preceding DCU in the chain and with a next DCU in the chain, and via a third of said at least three connections is connected to one of the local I/O ports of the WSU.

2. The device according to claim 1, wherein the WSU is implemented as a Wavelength Selective Switch WSS, a Reconfigurable Optical Add Drop Multiplexer ROADM, a Wavelength selective Optical Cross Connect WOXC or a Wavelength Router WR.

3. The device according to claim 1, wherein the DCU comprises a Dispersion Compensation Fiber (DCF) or a Dispersion Compensation Module (DCM), associated with a 2×1 or a 2×2 optical coupler.

4. The device according to claim 1, wherein the WSU is WSS, the dispersion compensation cascade comprises an additional DCU chain, thereby the cascade comprising a first DCU chain and a second DCU chain, and wherein said two DCM chains are connected to the local I/O ports of the WSS in such a manner that the DCUs of the first chain receive the currently assigned sets of optical channels from the WSS, while DCUs of the second chain send other sets of optical channels to the WSS.

5. The device according to claim 4, wherein the WSU is a reconfigurable add-drop multiplexer ROADM, wherein the input line of the RWSDCD is a common input port of the ROADM, the output line of the RWSDCD is a through line of the ROADM, and the local I/O ports of the WSU are add/drop ports of the ROADM.

6. A reconfigurable wavelength selective dispersion compensation device RWSDCD for selective compensation of dispersion in optical channels having respective different wavelengths, the RWSDCD having an input line for inputting incoming optical channels, and an output line for outputting outgoing optical channels, the RWSDCD comprising: a controllable wavelength selective unit WSU having a plurality of local, wavelength related input/output (I/O) ports; the WSU being adapted to controllably configure assignment of the incoming optical channels to the local I/O ports of said plurality in a way that any number of said incoming optical channels may at a time utilize any of said local I/O ports; a dispersion compensation cascade comprising at least one chain of successively connected dispersion compensation units DCUs, wherein one or more of the DCUs in the chain are respectively connectable to one or more of said local I/O ports; the arrangement of the RWSDCD being such that the output line outputs from the RWSDCD said outgoing optical channels comprising one or more of said incoming optical channels upon selectively compensating chromatic dispersion in them by controllably passing said one or more of the incoming optical channels via one or more DCUs of said dispersion compensation cascade, wherein said WSU is implemented as a Wavelength Router WR, wherein the input line of the RWSDCD is formed by the incoming optical channels having controllably changeable wavelengths and being entered in parallel into the WR; wherein ports of the wavelength router WR are said local I/O ports of the WSU, and the DCU cascade is connected to said output ports of the WR.

7. The device according to claim 1, controllable either by an operator, or by a control entity being a local control unit and/or a Network Management System, for selectively adjusting dispersion in the optical channels handled by the RWSDCD.

8. The device according to claim 7, further comprising a monitoring unit interconnected with the control unit, for monitoring chromatic dispersion in the optical communication channels handled by the RWSDCD.

9. A reconfigurable wavelength selective dispersion compensation device RWSDCD for selective compensation of dispersion in optical channels having respective different wavelengths, the RWSDCD having an input line for inputting incoming optical channels, and an output line for outputting outgoing optical channels, the RWSDCD comprising: a controllable wavelength selective unit WSU having a plurality of local, wavelength related input/output (I/O) ports; the WSU being adapted to controllably configure assignment of the incoming optical channels to the local I/O ports of said plurality in a way that any number of said incoming optical channels may at a time utilize any of said local I/O ports; a dispersion compensation cascade comprising at least one chain of successively connected dispersion compensation units DCUs, wherein one or more of the DCUs in the chain are respectively connectable to one or more of said local I/O ports; the arrangement of the RWSDCD being such that the output line outputs from the RWSDCD said outgoing optical channels comprising one or more of said incoming optical channels upon selectively compensating chromatic dispersion in them by controllably passing said one or more of the incoming optical channels via one or more DCUs of said dispersion compensation cascade controllable either by an operator, or by a control entity being a local control unit and/or a Network Management System, for selectively adjusting dispersion in the optical channels handled by the RWSDCD, comprising a monitoring unit interconnected with the control unit, for monitoring chromatic dispersion in the optical communication channels handled by the RWSDCD, and wherein the control unit is adapted to combine the following operations, whenever informed by the monitoring unit about deterioration of chromatic dispersion in a particular optical channel:
  adjusting dispersion in said channel by controllably changing a local I/O port of the WSU;
  changing the wavelength of said optical channel.

10. A reconfigurable wavelength selective dispersion compensation device RWSDCD for selective compensation of dispersion in optical channels having respective different wavelengths, the RWSDCD having an input line for inputting incoming optical channels, and an output line for outputting outgoing optical channels, the RWSDCD comprising: a controllable wavelength selective unit WSU having a plurality of local, wavelength related input/output (I/O) ports; the WSU being adapted to controllably configure assignment of the incoming optical channels to the local I/O ports of said plurality in a way that any number of said incoming optical channels may at a time utilize any of said local I/O ports; a dispersion compensation cascade comprising at least one chain of successively connected dispersion compensation units DCUs, wherein one or more of the DCUs in the chain are respectively connectable to one or more of said local I/O ports; the arrangement of the RWSDCD being such that the output line outputs from the RWSDCD said outgoing optical channels comprising one or more of said incoming optical channels upon selectively compensating chromatic dispersion in them by controllably passing said one or more of the incoming optical channels via one or more DCUs of said dispersion compensation cascade controllable either by an operator, or by a control entity being a local control unit and/or a Network Management System, for selectively adjusting dispersion in the optical channels handled by the RWSDCD, wherein the control unit is preliminarily provided with a data base of routes, stored in the control unit; the control unit being in communication with NMS and, whenever informed by the NMS about the a change of route of a specific optical channel, being adapted to determine in said internal data base at least one of the following:
  a new combination of DCUs in the cascade suitable for compensating dispersion on the new route; and
  a new wavelength to be used for the new route.

11. A reconfigurable wavelength selective dispersion compensation device RWSDCD for selective compensation of dispersion in optical channels having respective different wavelengths, the RWSDCD having an input line for inputting incoming optical channels, and an output line for outputting outgoing optical channels, the RWSDCD comprising: a controllable wavelength selective unit WSU having a plurality of local, wavelength related input/output (I/O) ports; the WSU being adapted to controllably configure assignment of the incoming optical channels to the local I/O ports of said plurality in a way that any number of said incoming optical channels may at a time utilize any of said local I/O ports; a dispersion compensation cascade comprising at least one chain of successively connected dispersion compensation units DCUs, wherein one or more of the DCUs in the chain are respectively connectable to one or more of said local I/O ports; the arrangement of the RWSDCD being such that the output line outputs from the RWSDCD said outgoing optical channels comprising one or more of said incoming optical channels upon selectively compensating chromatic dispersion in them by controllably passing said one or more of the incoming optical channels via one or more DCUs of said dispersion compensation cascade provided with one or more controllable switches respectively inserted between one or more of the local I/O ports and one or more of said DCUs in the chain; each of said switches, when in its closed position, connecting a specific local I/O port to a specific DCU, while when in its open position, disconnecting said specific local I/O port with said specific DCU.

12. A network node incorporating the device according to claim 1.

* * * * *